(12) United States Patent
Carpenter et al.

(10) Patent No.: US 7,547,400 B1
(45) Date of Patent: Jun. 16, 2009

(54) NANOPARTICLE NICKEL ZINC FERRITES SYNTHESIZED USING REVERSE MICELLES

(75) Inventors: Everett E. Carpenter, Mechanicsville, VA (US); Vincent G. Harris, Sharon, MA (US); Shannon A. Morrison, Moseley, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 266 days.

(21) Appl. No.: 11/148,570

(22) Filed: Jun. 1, 2005

Related U.S. Application Data

(60) Provisional application No. 60/578,072, filed on Jun. 1, 2004.

(51) Int. Cl.
C01G 49/00 (2006.01)
(52) U.S. Cl. .............. 252/62.62; 423/594.3; 423/594.1; 977/811; 977/840
(58) Field of Classification Search .............. 252/62.62; 977/811, 840
See application file for complete search history.

(56) References Cited

U.S. PATENT DOCUMENTS 4,097,392 A 6/1978 Goldman et al.
5,872,534 A 2/1999 Mayer

OTHER PUBLICATIONS

Yener et al, "Synthesis of Pure and Manganese-, Nicel-, and Zinc-Doped Ferrite Particles in Water-in-Oil Microemulsions", J. Am. Ceram. Soc., 84 [9], pp. 1987-1995, Sep. 2001.*
Gubbala et al, "Magnetic properties of nanocrsytalline Ni-Zn, Zn-Mn, and Ni-Mn ferrites sythesized by reverse micelle technique", Physica B, 384, pp. 317-328, available online Feb. 13, 2004.*
Uskokovic et al, "Synthesis of nanocrystalline Nickel-Zinc Ferrites Within Reverse Micelles", MTAEC (materiali in technologije) 9, 37 (3-4), 129-131, 2003.*
MDS sheet for NP4, tergitol NP-4.*
MDS sheet for NP7, tergitol NP-7.*
Aluquerque et al, "Nanosized poqders of NiZn ferrite: Synthesis, structure, and magnetism", Jour. Appl. Phys. vol. 87, No. 9, May 1, 2000, pp. 4352-4357.*
Albuquerque, et al., Nanosized Powders of NiZn ferrite, J. Appl. Phyics, 87, 4352, 2000.
Takanori Tsutaoka, Frequency dispersion of complex permeability in Mn-Zn and Ni-Zn spinel ferrites and their composite materials, J. Appl. Phys., 93 (5) 2789-2796 (2003).
Dias et al., Hydrothermal synthesis and sintering of nickel and manganese-zinc ferrites, J. Mater. Res., 12 (12) 3278-3285 (1997).
Albertina Cabanas and Martyn Poliakoff, The continuous hydrothermal synthesis of nano-particulate ferrites in near critical and supercritical water, J. Mater. Chem., 11, 1408-1416 (2001).
Y. Tamura, T. Sasao, M. Abe and T. Itoh, Ferrite Formation in Aqueous Solution at 100-200° C, Journal of Colloid and Interface Science, 136, 242-248 (1990).

A. Dias, R. L. Moreira, Chemical, mechanical and dielectric properties after sintering of hydrothern1al nickel-zinc ferrites, Mater. Lett., 39, 69-76 (1999).
Hyun J. Song, Jae H. Oh, Seung C. Choi and Jae C. Lee, Preparation and Characterization of Ni Ferrite Powders by Urea Decomposition, Physica Status Solidi A, 189 (3) 849-852 (2002).
P. C. Fannin, S. W. Charles, J.L. Dormann, Field dependence of the dynamic properties of colloidal suspensions of $Mn_{0.66}ZN_{0.34}Fe_2O_4$ and $Ni_{0.5}Zn_{0.5}Fe_2O_4$ particles, Journal of Magnetism and Magnetic Materials, 201, 98-101 (1999).
P. S. Anil Kumar, J. J. Shrotri, S. D. Kulkarni, C. E. Deshpande, S. K. Date, Low temperature synthesis of $Ni_{0.8}Zn_{0.2}Fe_2O_4$ powder and its Characterization, Mater. Lett., 27, 293-296 (1996).
J. S. Jiang, L. Gao, X. L. Yang, J. K. Guo, and H. L. Shen, Nanocrystalline NiZn ferrite synthesized by high energy ball milling, J. Mater. Sci. Lett. 18, 1781-1783 (1999).
M. P. Pileni, Fabrication and Properties of Nanosized Material Made by Using Colloidal Assemblies as Templates, Crystal Research and Technology, 33, 1155-1186 (1998).
Charles J. O'Connor, Candace T. Seip, Everett E. Carpenter, Sichu Li, and Vijay T. John, Synthesis and Reactivity of Nanophase Ferrites in Reverse Micellar Solutions, Nanostructured Materials, 12, 65-70 (1999).
J. Rivas, M. A. Lopez-Quintela, J. A. Lopez-Perez, L. Liz, R. J. Duro, First steps towards tailoring fine and ultrafine iron particles using microemulsions, IEEE Transactions on Magnetics, 29 (6) 2655-2657 (1993).
Markus Lade, Holger Mays, Jorg Schmidt, Regine Willumeit, Reinhard Schomacker, On the nanoparticle synthesis in microen1ulsions: detailed characterization of an applied reaction mixture, Colloids and Surfaces A: Physicochemical and Engineering Aspects 163, 3-15 (2000).
Everett E. Carpenter, Candace T. Seip, and Charles J. O'Connor, Magnetism of nanophase metal and metal alloy particles formed in ordered phases, J. Appl. Phys., 85 (8) 5184-5186 (1999).
Doruk O. Yener and Herbert Giesche, Synthesis of Pure and Manganese-, Nickel-, and Zinc-Doped Ferrite Particles in Water-in-Oil MicroemulsionsJ. Am. Ceram. Soc., 84 (9) 1987-95 (2001).
Uskokovic et al, Synthesis of Nanocrystalline Nickel-Zinc Ferrites Within Reverse Micelles, Materiali in Tehnologije 37 (2003) 3-4, p. 129-131.
Gubbala, et al, Magnetic properties of nanocrystalline Ni-Zn, Zn-Mn, and Ni-Mn ferrites synthesized by reverse micelle technique, Physica B 348 (2004) 317-328.
Morrison, et al., Atomic Engineering of Mixed Ferrite and Core-Shell Nanoparticles, Journal of Nanoscience and Nanotechnology, vol. 5, 1323-1344, 2005.
Morrison, et al, Magnetic and structural properties of nickel zinc ferrite nanoparticles synthesized at room temperature, Journal of Applied Physics vol. 95, No. II, Jun. 1, 2004, p. 6392-6395.
Tamaura, et al., Ferrite Formation in Aqueous Solution at 100-200° C, Jnl. Colloid and Interface Sci., vol. 136, No. 1, p. 242 (1989).

* cited by examiner

*Primary Examiner*—C. Melissa Koslow
(74) *Attorney, Agent, or Firm*—John J. Karasek; Amy Ressing

(57) ABSTRACT

A method for making monodispersed magnetic nanoparticles of nickel zinc ferrite (NZFO) at room temperature by mixing together two micelle solutions. The first micelle solution comprises zinc, nickel, and iron metal salts; a surfactant; and a hydrocarbon. The second micelle solution comprises an aqueous hydroxide, a surfactant, and a hydrocarbon. After mixing the two micelle solutions, the ferrite precipitates.

4 Claims, 4 Drawing Sheets

NANOPARTICLE NICKEL ZINC FERRITES SYNTHESIZED USING REVERSE MICELLES

CROSS-REFERENCE TO RELATED APPLICATIONS

This Application claim the benefit of Provisional Application No. 60/578,072, Carpenter et al., "NANOPARTICLE NICKEL ZINC FERRITES SYNTHESISZED USING REVERSE MICELLE", filed on Jun. 1, 2004, which is incorporated by reference herein.

BACKGROUND OF THE INVENTION

The present invention relates to nickel zinc ferrite and more specifically to a method of making monodispersed magnetic nanoparticles of nickel zinc ferrite.

Nickel zinc ferrite (NZFO) is useful in electromagnetic applications that require a high permeability, such as inductors and electromagnetic wave absorbers (Takanori Tsutaoka, J. App. Phys., 93 (5) 2789-2796 (2003), the entire contents of which are incorporated herein by reference). There is interest to make nanosized NZFO particles to reduce energy losses associated with bulk powders. Further, most electronic applications require the particles to be pressed into larger shapes with near theoretical density, which is difficult to obtain if the particles have a wide size distribution.

NZFO nanoparticles have been synthesized in a variety of methods including hydrothermal processing, mechanochemical processing, ceramic processing (i.e., solid state reaction) and a variety of solution chemistry methods. Using reverse micelle synthesis it is possible to form uniform size NZFO particles where the size can be tailored as well as its stoichiometry. Currently, there is not a reliable method for the processing of NZFO nanoparticles. In recent years, physical methods such as ball milling and chemical methods like hydrothermal synthesis have shown promise, but have fallen short of providing reliable single phase nanoparticles of NZFO where the size and chemical composition can be controlled. See, for example, Anderson Dias and Vicente Tadeu Lopes Buono, J. Mater. Res., 12 (12) 3278-3285 (1997); Albertina Cabanas and Martyn Poliakoff, J. Mater. Chem., 11, 1408-1416 (2001); Y. Tamura, T. Sasao, M. Abe and T. Itoh, Journal of Colloid and Interface Science, 136, 242-248 (1990); A. Dias, R. L. Moreira, Mater. Lett., 39, 69-76 (1999); Hyun J. Song, Jae H. Oh, Seung C. Choi and Jae C. Lee, Physica Status Solidi A, 189 (3) 849-852 (2002); P. C. Fannin, S. W. Charles, J. L. Dormann, Journal of Magnetism and Magnetic Materials, 201, 98-101 (1999); P. S. Anil Kumar, J. J. Shrotri, S. D. Kulkarni, C. E. Deshpande, S. K. Date, Mater. Lett., 27, 293-296 (1996); Adriana S. Albuquerque, Jose D. Ardisson, Waldemar A. A. Macedo, and Maria C. M. Alves, J. App. Phys., 87 (9) 4352-4357 (2000); and J. S. Jiang, L. Gao, X. L. Yang, J. K. Guo, and H. L. Shen, J. Mater. Sci. Lett. 18, 1781-1783 (1999), the entire contents of each are incorporated herein by reference.

Reverse micelle synthesis has been used in other oxide systems with considerable control over nanoparticle size and distribution. See, for example, M. P. Pileni, Crystal Research and Technology, 33, 1155-1186 (1998); J. Sims, A. Kumbhar, J. Lin, F. Agnoli, E. Carpenter, C. Sangregorio, C. Frommen, V. Kolesnichenko, and C. J. O'Connor, Molecular Crystals and Liquid Crystals, 279, 113-120 (2002); and Charles J. O'Connor, Candace T. Seip, Everett E. Carpenter, Sichu Li, and Vijay T. John, Nanostructured Materials, 12, 65-70 (1999), the entire contents of each are incorporated herein by reference. Briefly, reverse micelles are water-in-oil emulsions in which the water to surfactant ratio controls the size of water pools within which aqueous chemical syntheses take place, and consequently control the size resultant particles (J. Rivas, M. A. Lopez-Quintela, J. A. Lopez-Perez, L. Liz, R. J. Duro, IEEE Transactions on Magnetics, 29 (6) 2655-2657 (1993), the entire contents of which are incorporated herein by reference). This technique is particularly attractive for room temperature reactions such as the precipitation of oxide nanoparticles (Markus Lade, Holger Mays, Jorg Schmidt, Regine Willumeit, Reinhard Schomacker, Colloids and Surfaces A: Physicochemical and Engineering Aspects 163, 3-15 (2000), the entire contents of which are incorporated herein by reference). Synthesis of various nanoparticles within reverse micelles, specifically ferrites, has demonstrated the ability to control the particle size, size distribution (Charles J. O'Connor, Candace T. Seip, Everett E. Carpenter, Sichu Li, and Vijay T. John, NanoStructured Materials, 12, 65-70 (1999); and M. P. Pileni, A. Hammouda, N. Moumen, and I. Lisiecki, Fine Particle Science and Technology, edited by E. Pelizzetti (Kluwer Academic Publishers, Netherlands, 1996), p. 413-429; the entire contents of both are incorporated herein by reference), chemical stoichiometry, and cation occupancy (Everett E. Carpenter, Candace T. Seip, and Charles J. O'Connor, J. App. Phys., 85 (8) 5184-5186 (1999), the entire contents of which are incorporated herein by reference). However, previous work has often produced precursor particles that require subsequent firing (P. S. Anil Kumar, J. J. Shrotri, S. D. Kulkarni, C. E. Deshpande, S. K. Date, Mater. Lett., 27, 293-296 (1996); and Doruk O. Yener and Herbert Giesche, J. Am. Ceram. Soc., 84 (9) 1987-95 (2001), the entire contents of both are incorporated herein by reference).

The room-temperature synthesis of nanoscale NZFO ferrites that do not require further processing is disclosed herein. A surfactant system was employed for the room-temperature reverse micelle synthesis of NZFO nanoparticles. Sodium dioctylsulfosuccinate (AOT), was combined with a 2,2,4-trimethylpentane (isooctane) oil phase to make the reverse micelle solution. This allowed comparison to similarly produced materials from other research groups in which NZFO was synthesized in reverse micelles and subsequently fired to produce the desired product. The materials disclosed herein do not need a subsequent firing step. The reaction conditions of this system are optimized to produce, at room temperature, pure phase nanoscale NZFO particles over a narrow size distribution.

BRIEF SUMMARY OF THE INVENTION

The aforementioned problems with the current technologies are overcome by the present invention wherein nanoparticle nickel zinc ferrites (NZFO) are synthesized at room temperature by mixing a first micelle solution comprising zinc, nickel, and iron metal salts, a surfactant, and a hydrocarbon with a second micelle solution comprising an aqueous hydroxide, a surfactant, and a hydrocarbon, whereby the ferrite precipitates without the need for further processing. The reverse micelle method is shown to synthesize NZFO having a range of compositions from X=0 to 1 with $(Ni,Zn)_xFe_{2-x}O_4$, and a crystallite size ranging from 5 to 40 nm diameter.

An embodiment of the present invention is a process for making monodispersed magnetic nanoparticles of NZFO. Monodispersed for the purposes of this application is defined as a powder sample having a particle size distribution where the standard deviation is no greater than 12% of the mean value. Nanoparticles for the purposes of this invention are defined as particles having a length no greater than 50 nm in any of the three spatial dimensions. The NZFO system is highly commercialized in powder form, but, as yet, cannot be reliably synthesized in reduced dimensions (i.e., as nanoparticles). The utility of such particles include their packaging and performance as elements in high frequency devices as well as biomedical applications.

The significant advantages of the ferrites of this invention are the uniformity and reduced size of particles that lend for improved packaging and performance, and the lower sintering temperature in processing (23° C. versus >500° C. (typically)), and the control and tenability of particle size and chemistry afforded by the micelle synthesis.

DETAILED DESCRIPTION OF THE INVENTION

Figure 1:
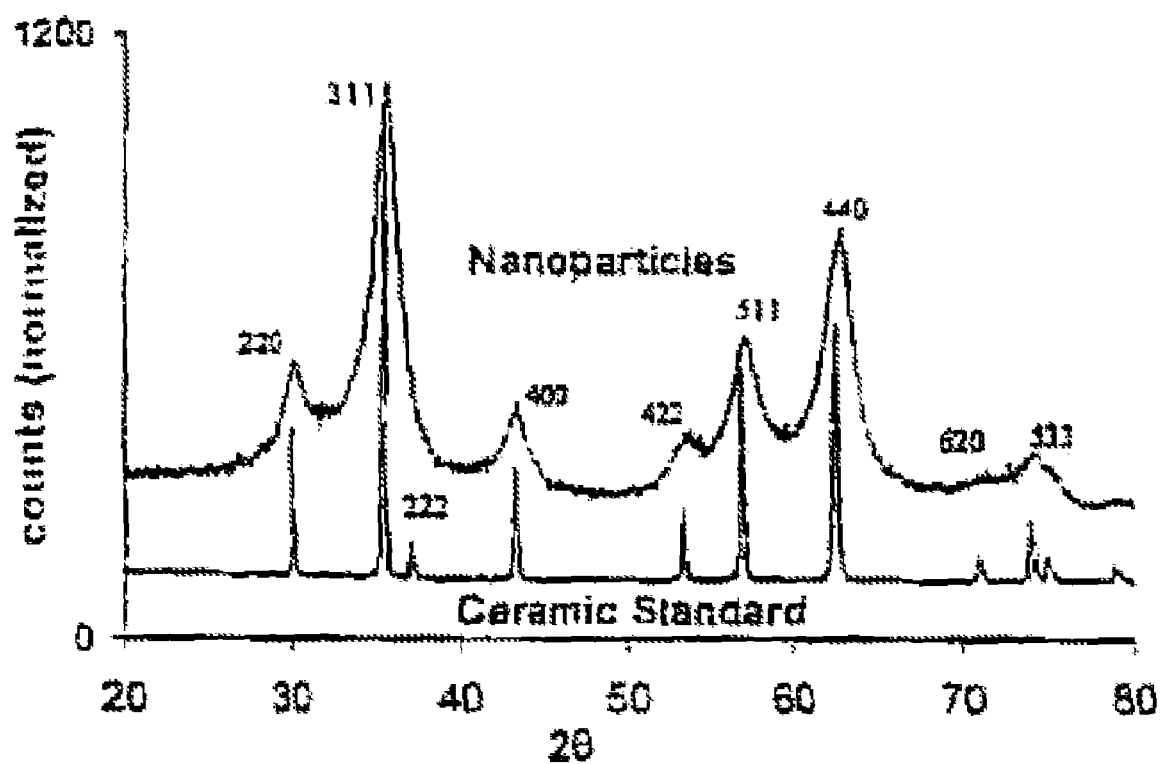
FIG. 1 shows X-ray powder diffraction of NZFO nanoparticles and a ceramic bulk sample.

In the synthesis of NZFO, micelle solutions are prepared from an aqueous solution of Zn, Ni, and Fe metal salts (e.g., $Cl^-$, $NO_3^-$, or $SO_4^{-2}$), surfactant (e.g., Nonyl phenol ethoxylate (NP) or sodium dioctylsulfosuccinate (AOT)), and hydrocarbon (e.g., cyclohexane or 2,2,4-trimethylpentane). The pH of the solution is adjusted to induce precipitation and oxidation within the water pools by using a micelle solution of an aqueous hydroxide (e.g. ammonium hydroxide, sodium hydroxide, or potassium hydroxide), a surfactant, and a hydrocarbon. The two solutions are mixed precipitating the ferrite precursor. The surfactants are washed away, and the resulting powder is dried under vacuum.

Disclosed is a method for synthesizing nanoparticle nickel zinc ferrites using reverse micelles. A first micelle solution is prepared from an aqueous solution of Zn, Ni, and Fe metal salts, a surfactant, and a hydrocarbon. A second micelle solution is prepared from an aqueous hydroxide, a surfactant, and a hydrocarbon. The two micelle solutions are mixed, and a ferrite precipitates. The surfactants are washed away, and the resulting powder is dried under vacuum. The surfactant in the first micelle solution is selected from the group consisting of nonyl phenol ethoxylate, sodium dioctylsulfosuccinante, and combinations thereof. The hydrocarbon in the first micelle solution is selected from the group consisting of cyclohexane, 2,2,4-trimethylpentane, and combinations thereof. The aqueous hydroxide in the second micelle solution is selected from the group consisting of ammonium hydroxide, sodium hydroxide, potassium hydroxide, and combinations thereof.

Further disclosed are nanoparticle nickel zinc ferrites prepared by preparing the following method. A first micelle solution is prepared from an aqueous solution of Zn, Ni, and Fe metal salts, a surfactant, and a hydrocarbon. A second micelle solution is prepared from an aqueous hydroxide, a surfactant, and a hydrocarbon. The first and second micelle solutions are mixed, whereby a ferrite precipitates. The surfactants are washed away, and the resulting powder is dried under vacuum. The surfactant in the first micelle solution is selected from the group consisting of nonyl phenol ethoxylate, sodium dioctylsulfosuccinante, and combinations thereof. The hydrocarbon in said first micelle solution is selected from the group consisting of cyclohexane, 2,2,4-trimethylpentane, and combinations thereof. The aqueous hydroxide in said second micelle solution is selected from the group consisting of ammonium hydroxide, sodium hydroxide, potassium hydroxide, and combinations thereof.

Sample Synthesis

This example was done in a 500 mL flask; the total volume of solution was ~350 mL. Two solutions were prepared: one with the metal salts in aqueous reverse micelles, and the second with ammonia in aqueous reverse micelles. Below, NP stands for Nonyl phenol poly(ethyloxyate), and the number indicates the number of repeat units in the ethyloxyate. NP is sold under several commercial names; in this example Igepal® CO-520 and Igepal® CO-630 were used.

A solution NP4, NP7, and cyclohexane is premixed. For 100 mL of cyclohexane, add an amount of NP4 ranging from 4 mL to 30 mL and an amount of NP7 that is equal to (33 mL less the amount of NP4 already added). Thus a total of 33 mL of the combination of NP4 and NP7 is added for every 100 mL of cyclohexane. At least 300 mL of this NP4/NP7/cyclohexane solution is prepared.

Metal salts were weighed out and dissolved in water by mixing or agitating to make three aqueous metal solutions. For this example, the total water was 4.8 mL. The molarity of metal was less than 0.6 The amounts of metal salts and water used are as follows:

0.3 g of $FeCl_2$ dissolved in 2.7 mL of water
0.036 to 0.179 g $NiCl_2$ dissolved in 1 mL of water
0.021 to 0.103 g $ZnCl_2$ dissolved in 1 mL of water (one drop of HCl was added to the Zn solution to ensure that it does not precipitate out).

A metal salt micelle solution was prepared. The three aqueous metal solutions were mixed together with 105 mL of the NP4/NP7/cyclohexane solution in a flask under flowing nitrogen gas.

An ammonia reverse micelle solution was prepared by mixing 5.0 mL of water with 5.0 mL of ammonia. Once mixed, 220 mL of the NP4/NP7/cyclohexane solution was added and mixed or agitated until it was visibly clear.

The ammonia reverse micelle solution was added to the aqueous metal reverse micelle solution while stirring. The solutions were allowed to mix under flowing nitrogen for 2 hours.

About 250 mL of methanol was added to disperse the reverse micelles and precipitate out the NZFO nanoparticles.

Characterization

The NZFO nanoparticles described in this invention consist of nickel zinc ferrites of the general formula $(Ni_xZn_{1-x})_\delta Fe_{2-\delta}O_4$ where $x \geq 0.2$-$0.7$ and $\delta$ is less than or equal to $\pm 0.3$. Dynamic light scattering is used to determine particle size and verified using transmission electron microscopy, while composition is determined by inductively coupled plasma. The crystal structure is determined by x-ray powder diffraction and x-ray absorption fine structure measurements. The magnetic properties of these nanoparticles are measured using a SQUID magnetometer over a temperature range of 10 K-300 K. A first successful trial had a 14 nm particle diameter (measured by dynamic light scattering) which maintained a 6 nm crystallite size (as calculated by Scherrer analysis). The measured saturation magnetization 38 emu/g (at 10 K) and 25 emu/g (at 300 K) compared with that of other NZFO nanoparticles reported in the literature as 31 emu/g and 13 emu/g respectively. The magnetization coincides to superparamagnetism and possibly to surface disruption of the magnetic interactions. The magnetization can be increased with suitable packaging of the particles via interparticle exchange coupling.

High Frequency Materials

One reason for preparing NZFO as nanoparticles is to reduce conduction losses at high frequency by disruption eddy current paths. NZFO has the highest magnetic moment of the metal oxides that are useful for applications over 30 MHz$\leq$f$\leq$3 GHz and a reduced conduction loss would result in improved performance and an extended frequency range of operation. Nanoparticles having a well-defined particle size distribution can also allow for a broader range of packaging, specifically, as high density compacts, but also as ferrofluids and related slurries.

SPECIFIC EXAMPLES

NiZn Ferrite processed using the AOT surfactant resulted in a 6 nm diameter particle powder.

NiZn Ferrite processed using the NP surfactant resulted in a 14 nm diameter particle powder.

EXAMPLE

For the AOT/isooctane reverse micelle system, a stock solution of 0.5M AOT was prepared in isooctane. An aqueous metal solution was then prepared using 0.045M $FeCl_2$, 0.011M $NiCl_2$, and 0.011M $ZnCl_2$. The AOT solution was added volumetrically to the aqueous metal solution to form a reverse micelle solution. An analogous solution was made using water and concentrated ammonia in a 1:1 ratio. The ammonia solution was used to adjust the pH of the aqueous metal solution to induce precipitation and oxidation within the water pools. The mole ratio of ammonia to metal cations was greater than 12:1 and the relative volume of AOT solution to water was 6:1, corresponding to an $\omega$ of 16.5.

Both the metal containing reverse micelle solution and the corresponding ammonia solution were agitated until each was visibly clear, sonicated for 5 min and then purged with flowing nitrogen for 5 min. The metal solution was placed in an addition funnel and added to the ammonia solution while stirring. Once the addition was complete, the reaction was stirred for 2 h. Excess methanol was added and mixed with the reverse micelle solution to disrupt the micelles and remove surfactant from the particles. This mixture was centrifuged and the supernatant removed. The material was washed and centrifuged repeatedly (~10x) with methanol and then methanol/water until the AOT was removed. The material was then dried over-night in a vacuum chamber.

X-ray powder diffraction was performed on the NZFO particles using a Phillips x-ray diffractometer employing Cu K$\alpha$ radiation from a sealed tube (50 kV, 30 mA) source. Analysis of the material revealed a match with PDF # 08-0234, indicating the nickel zinc ferrite structure (FIG. 1). Using the Scherrer equation, a crystallite diameter of 6.8 nm was determined.

Figure 2:
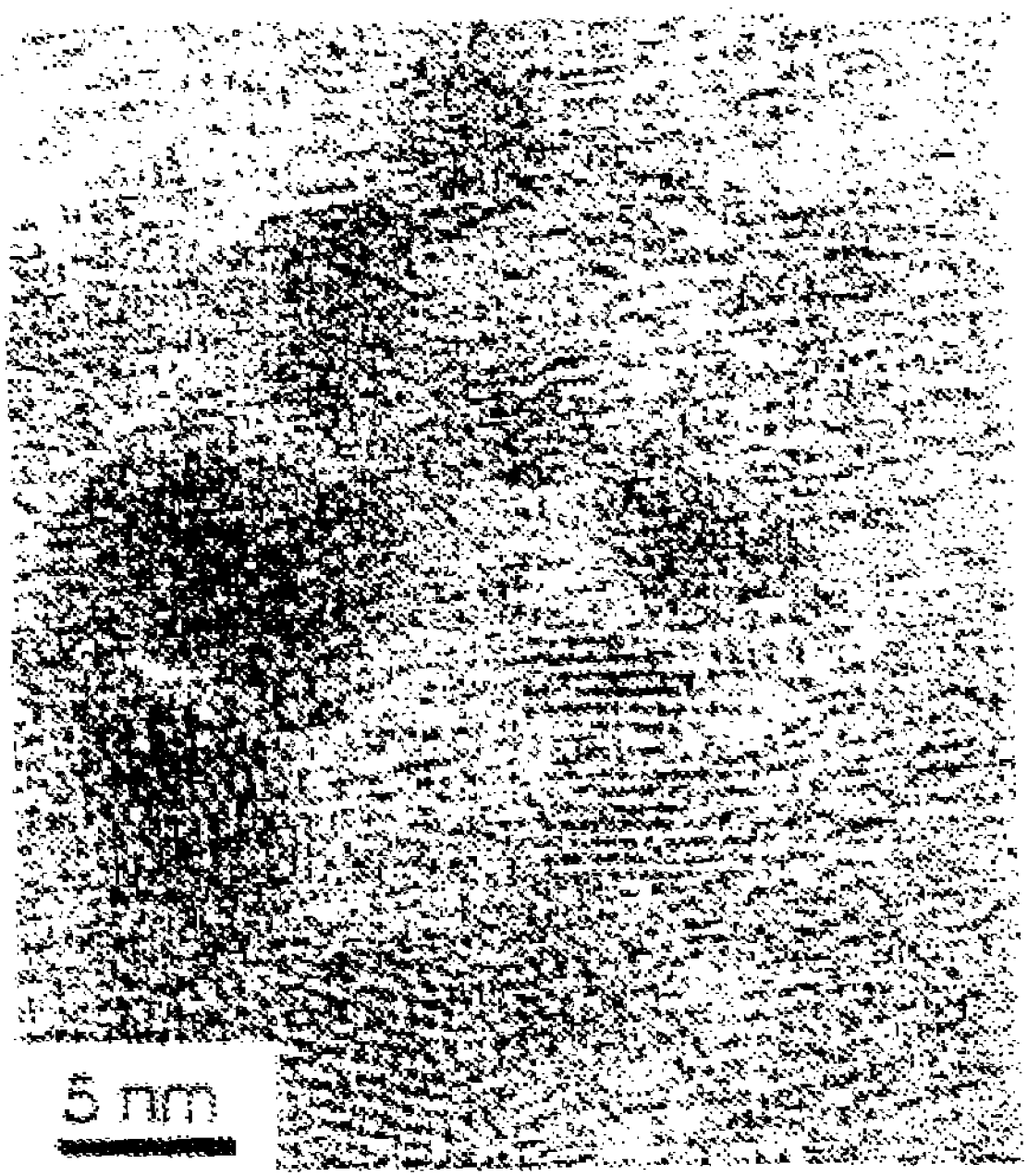
FIG. 2 shows TEM of NZFO nanoparticles.

A TECNAI F20 model high-resolution transmission electron microscope (TEM) was used to characterize the morphologies and the particle size distribution of the nanoparticles (FIG. 2). The NZFO nanoparticles were suspended in methanol and agitated in an ultrasonic bath. The TEM sample was prepared by placing a few drops of this suspension on a holey C film. The particle size distribution was estimated based on analyzing the bright field images of randomly selected nanoparticles. The average particle size was estimated to be 6.2 nm.

The elemental composition of the sample was determined using a PE Optima 4000 inductively coupled plasma-Optical Emission Spectrometer (ICP-OES). Samples for ICP-OES were prepared by dissolving in concentrated nitric acid in an acid digestion bomb at 170° C. Analysis of the data yielded the following molar percentages of metal composition: Ni:Zn:Fe 6.4:14.8:78.8. Magnetic properties were measured using a Quantum Design MPMS-5S SQUID magnetometer. Evaluation of the hysteresis loop (FIG. 3) gives a saturation magnetization of 25.9 emu/g at 300 K and 38.5 emu/g at 10 K, with coercivities of 16 and 63 Oe, respectively.

Extended x-ray absorption fine structure (EXAFS) spectra were collected at the National Synchrotron Light Source at Brookhaven National Laboratory using the NRL consortium beam lines X23B and X11A. EXAFS indicated that the material is single-phase spinel (Table I), in agreement with the XRD results. Preliminary EXAFS analysis suggested that the particles are not homogeneous with respect to chemical composition. A better fit to the data is achieved using a two-layer model (FIG. 4) in which the Zn metal ions have a greater concentration in the outer layer as compared to the center of the nanoparticles. The two-layer model yields (39±19) % of the zinc cations in octahedral sites (Table I), which contradicts the usual expectation of zinc occupying only tetrahedral sites. Both the homogeneous and two-layer models indicate that nickel cations occupy predominately octahedral sites. As can be seen from the magnetization versus temperature plot (FIG. 3 (b)), the particles are superparamagnetic above a blocking temperature of 50 K. A saturation magnetization of 25.9 emu/g was measured at 300 K, well above the blocking temperature, and was less than half the value of 70.3 emu/g for a ceramic standard. This value was also low when compared to published values for other nanoscale NZFO particles. A value of 44 emu/g at room temperature was reported for a coprecipitated particle 50 nm in diameter with a 16 nm crystallite, heated at 80° C. for 36 h. This lower value is consistent with particle size effects on saturation magnetization. Likewise, the saturation magnetization when measured at 10 K was lower, with a value of 38.5 emu/g for the nanoparticles, as compared to 119 emu/g for the ceramic sample.

TABLE I

Results determined from EXAFS fit using a two-layer model.

| Lattice parameter (Å) | 8.49(4) | | |
|---|---|---|---|
| Oxygen parameter | 0.387(8) | | |
| | Ni | Zn | Fe |
| EXAFS r factors | 0.031 | 0.032 | 0.033 |
| Percent of cation in octahedral sites | 95 | 39(19) | |
| MSRD (metal-O nearest neighbor) (Å$^2$) | 0.004(4) | 0.006(5) | 0.011(4) |

Figure 3A:
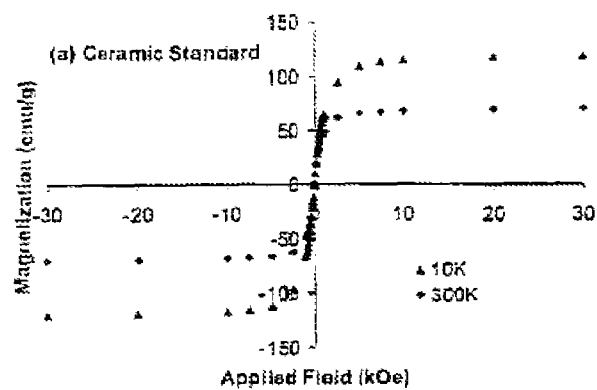
FIG. 3(a) shows a hysterisis loop for NZFO Bulk ceramic standard.
Figure 3B:
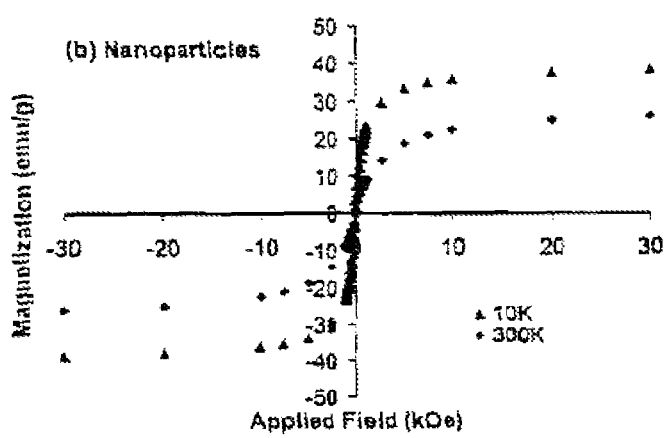
FIG. 3(b) shows a hysterisis loop for NZFO nanoparticles, measured at 10 K (triangle) and 300 K (diamond)
Figure 3C:
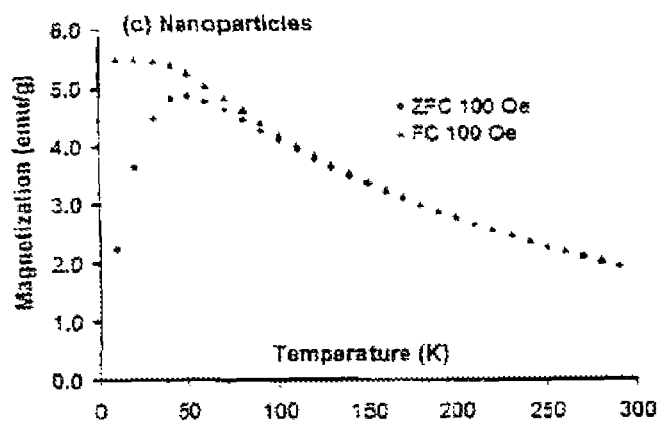
FIG. 3(c) shows magnetization versus temperature plot for the nanoparticles.
Figure 4:
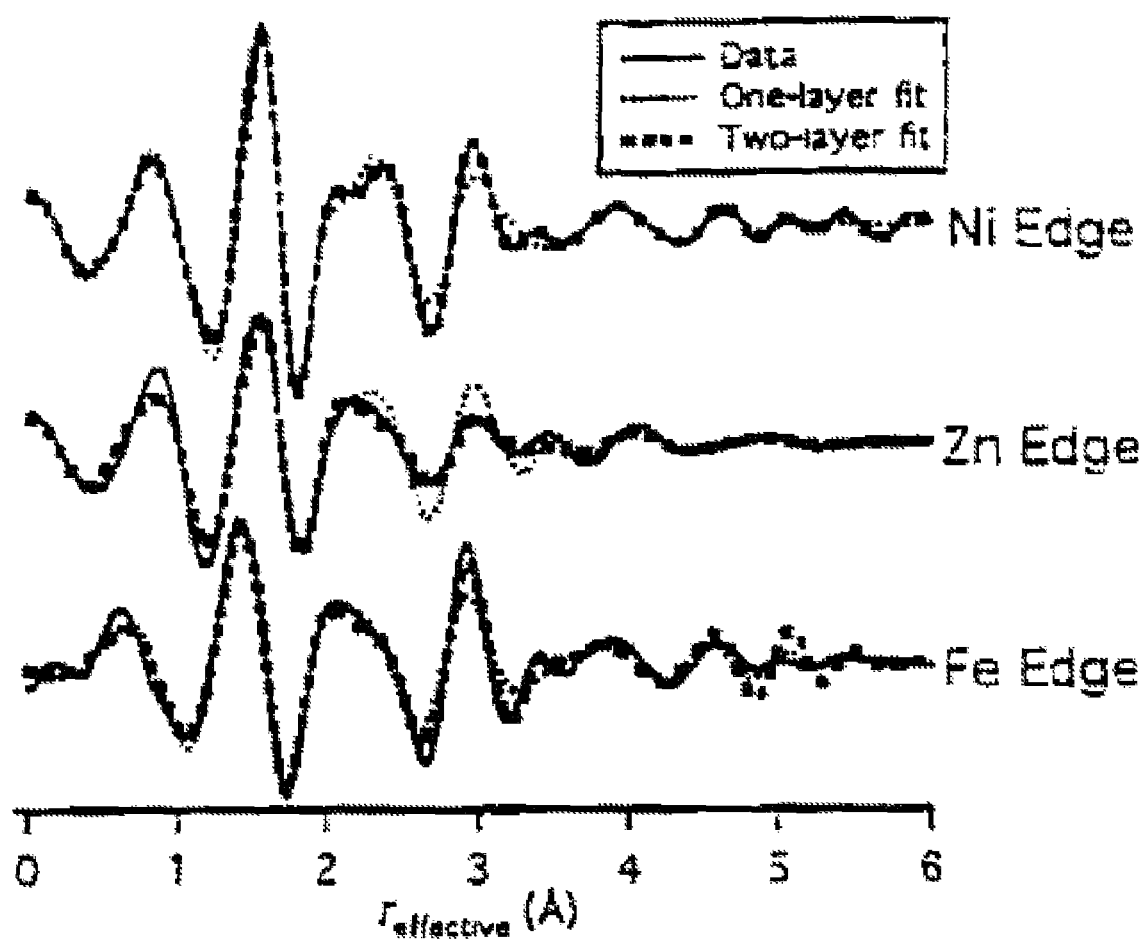
FIG. 4 shows real part of the EXAFS Fourier transforms for the three metallic constituents, with fits using one-layer and two-layer models also shown.

As can be seen from the magnetization versus temperature plot (FIG. 3 (b)), the particles are superparamagnetic above a blocking temperature of 50 K. A saturation magnetization of 25.9 emu/g was measured at 300 K, well above the blocking temperature, and was less than half the value of 70.3 emu/g for a ceramic standard. This value was also low when compared to published values for other nanoscale NZFO particles. A value of 44 emu/g at room temperature was reported for a coprecipitated particle 50 nm in diameter with a 16 nm crystallite, heated at 80° C. for 36 h. This lower value is consistent with particle size effects on saturation magnetization. Likewise, the saturation magnetization when measured at 10 K was lower, with a value of 38.5 emu/g for the nanoparticles, as compared to 119 emu/g for the ceramic sample.

Whereas size effects could explain the reduced magnetic saturation at room temperature, at temperatures below the blocking temperature the reduction can be further attributed to both elemental composition and site occupancies of the metal cations in the oxygen lattice. The NZFO ferrite presented herein, as verified by XRD and EXAFS, has the spinel crystal structure, and therefore consists of a face-centered-cubic array of oxygen atoms with cations occupying ⅛ of the tetrahedral sites and ½ of the octahedral sites. In order to balance the overall charge in this system, there is one cation in a +2 oxidation state and two cations in a +3 oxidation state for every four oxygen atoms. Since Zn and Ni prefer the +2 oxidation state, all of the +3 ions are therefore Fe. The ideal NZFO ferrite has the molar ratio $Ni_{1-x}Zn_xFe_2O_4$; ICP results for the present material, normalized to the ferrite notation are 0.19:0.44:2.36, indicating that some zinc and over half the nickel was lost in the synthesis. The ratio of Fe to Zn and Ni combined is more than 2:1, and EXAFS does not indicate any cation vacancies, thus requiring that some of the iron adopt the +2 oxidation state as well. Support for this conclusion can be found in the higher mean square radial displacement value for Fe (Table I) compared to Ni and Zn, suggesting that the Fe occupies more than one oxidation state within the material. Research into similar ferrite systems indicates that $Fe^{+2}$ preferentially occupies octahedral sites. Since the overall saturation magnetization is a combination of the spin only moments in the octahedral lattice minus the spin only moments in the tetrahedral lattice, reduction of $Fe^{+3}$ to $Fe^{+2}$ would lower the overall saturation magnetization.

In the inverse spinel structure, such as nickel zinc ferrites, nickel normally occupies an octahedral site, whereas the zinc occupies tetrahedral sites. EXAFS analysis for these samples suggest that the zinc is not evenly distributed within the individual particles giving the Ni:Zn:Fe molar ratio as 0.01:0.27:0.71 in the tetrahedral sites, and 0.09:0.09:0.82 in the octahedral sites. Though zinc occupancy of the octahedral site is not unprecedented, this is considered an indication of substantial cation disorder. Overloading of the outer layers by the zinc cations is proposed as the reason zinc occupies some of the octahedral sites. As a result of the zinc cation being diamagnetic, it cannot participate in superexchange coupling between the octahedral and tetrahedral lattices; therefore an inhomogeneous excess of zinc in the ferrite would disrupt some magnetic coupling and lead to an overall reduction in magnetism.

It is still unclear as to why this reverse micelle system has allowed formation of ferrite nanoparticles at room temperature, when other similar syntheses have required annealing. It appears that an important factor in the synthesis may be the pH range of the micelle solution. Metal cations in the micelle water pools will convert to their hydroxide form en route to the formation of the ferrite. For each species, the conversion of the metal ions to the hydroxide and then oxide form is controlled primarily by the pH. Since $Zn^{2+}$ remains soluble over a wider pH range than the other cations, it may precipitate at a later stage onto a nickel ferrite "nucleus," In a fashion consistent with the two-layer compositional model suggested by EXAFS. In reality, there is most likely a complex interplay of several factors, including the buffering capacity of AOT, the solubility of the cations across a range of pH, oxidation rates, and other surfactant related influences on particle growth.

The above description is that of a preferred embodiment of the invention. Various modifications and variations are possible in light of the above teachings. It is therefore to be understood that, within the scope of the appended claims, the invention may be practiced otherwise than as specifically described. Any reference to claim elements in the singular, e.g. using the articles "a," "an," "the," or "said" is not construed as limiting the element to the singular.

The invention claimed is:

1. A method for synthesizing monodispersed nanoparticle nickel zinc ferrites using reverse micelles, comprising:
    (a) preparing a first micelle solution from an aqueous solution of Zn, Ni, and Fe metal salts, a surfactant, and a hydrocarbon;
    (b) preparing a second micelle solution from an aqueous hydroxide, a surfactant, and a hydrocarbon; and
    (c) mixing said first and said second micelle solutions whereby a monodispersed nanoparticle ferrite precipitates, said monodispersed nanoparticle ferrite having a particle size distribution where the standard deviation is no greater than 12% of the mean value.

2. The method of claim 1 wherein said surfactant in the first micelle solution is selected from the group consisting of nonyl phenol ethoxylate, sodium dioctylsulfosuccinate.

3. The method of claim 1 wherein said hydrocarbon in said first micelle solution is selected from the group consisting of cyclohexane, 2,2,4-trimethylpentane, and combinations thereof.

4. The method of claim 1 wherein said aqueous hydroxide in said second micelle solution is selected from the group consisting of ammonium hydroxide, sodium hydroxide, potassium hydroxide, and combinations thereof.

* * * * *